United States Patent
Roth

(10) Patent No.: US 6,991,198 B1
(45) Date of Patent: Jan. 31, 2006

(54) APPARATUS FOR STIFFENING A HANGER ROD

(76) Inventor: Steven A. Roth, P.O. Box 0933, Alamo, CA (US) 94507

( * ) Notice: Subject to any disclaimer, the term of this patent is extended or adjusted under 35 U.S.C. 154(b) by 1055 days.

(21) Appl. No.: 09/610,510

(22) Filed: Jul. 6, 2000

(51) Int. Cl.
*E21F 17/02* (2006.01)

(52) U.S. Cl. .......................... 248/58; 248/74.1
(58) Field of Classification Search ................. 248/58, 248/74.1, 71, 72, 226.11, 228.1, 62, 507, 248/218.4
See application file for complete search history.

(56) References Cited

U.S. PATENT DOCUMENTS

| | | | | |
|---|---|---|---|---|
| 3,318,561 A | * | 5/1967 | Finke et al. ............. | 248/218.4 |
| 3,595,505 A | * | 7/1971 | Burwell et al. ............ | 248/539 |
| 3,713,613 A | * | 1/1973 | Searls ......................... | 248/49 |
| 4,793,580 A | * | 12/1988 | Richards ..................... | 248/188 |
| 5,403,032 A | * | 4/1995 | Hellwig ............... | 280/124.163 |
| 5,718,403 A | * | 2/1998 | Ott et al. .................. | 248/228.1 |
| 6,138,407 A | * | 10/2000 | Pierce ........................... | 47/46 |

FOREIGN PATENT DOCUMENTS

| | | |
|---|---|---|
| DE | 199 46 802 A1 * | 4/2001 |
| JP | 2000-318640 * | 11/2000 |

\* cited by examiner

*Primary Examiner*—Robert P. Olszewski
*Assistant Examiner*—A. Joseph Wujciak, III
(74) *Attorney, Agent, or Firm*—Thomas R. Lampe

(57) ABSTRACT

A hanger rod stiffener includes a clamp having two straight, double-ended, spaced, parallel clamp segments and a third clamp segment extending between them. The clamp is positioned over a stiffener member and a hanger rod and the third clamp segment is disposed at an angle to bias the hanger rod to a predetermined position within the clamp when the stiffener member and clamp are brought together.

1 Claim, 2 Drawing Sheets

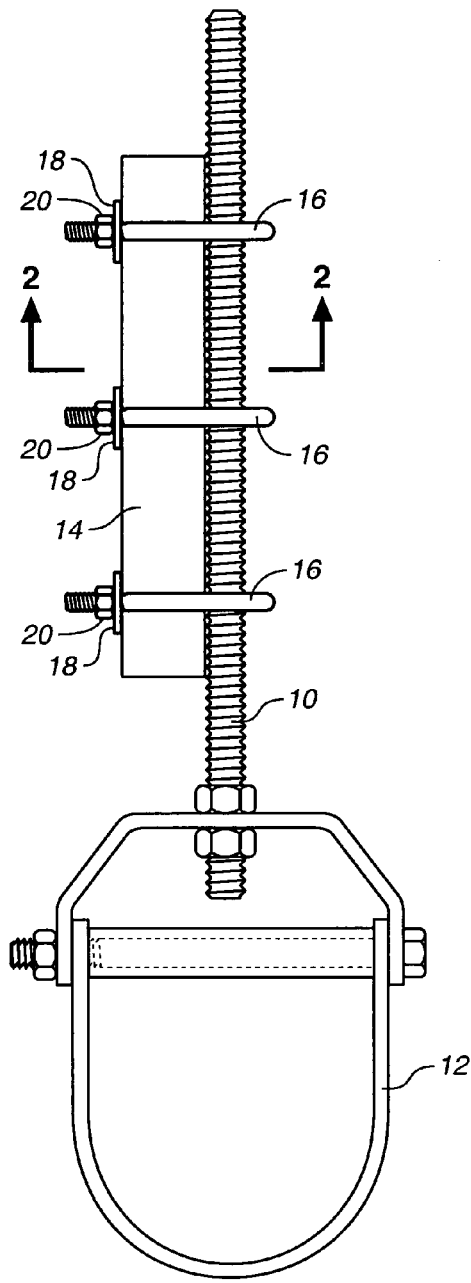
FIG._1 (PRIOR ART)
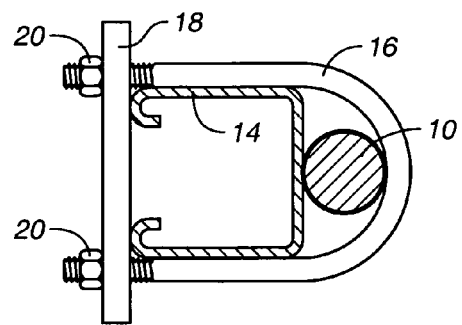
FIG._2 (PRIOR ART)
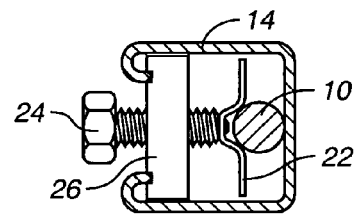
FIG._3 (PRIOR ART)
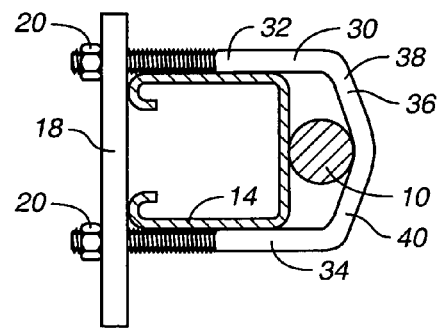
FIG._4
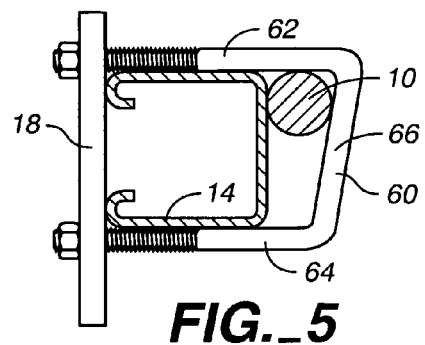
FIG._5

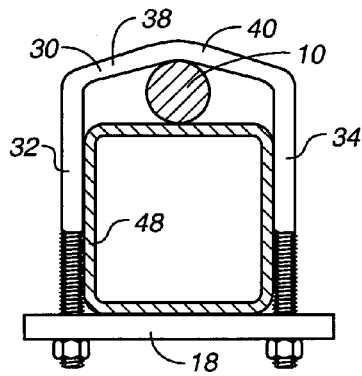
FIG._6A
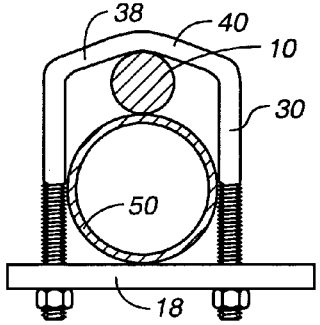
FIG._6B
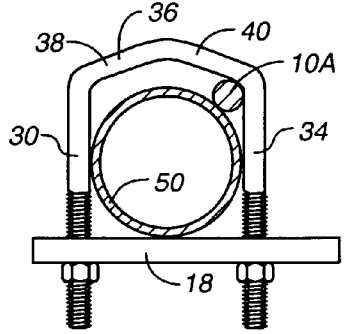
FIG._6C
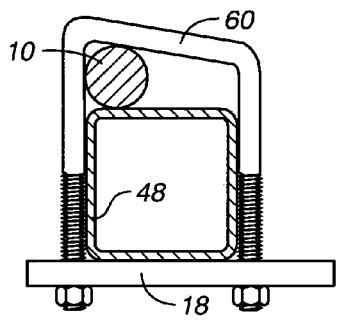
FIG._7A
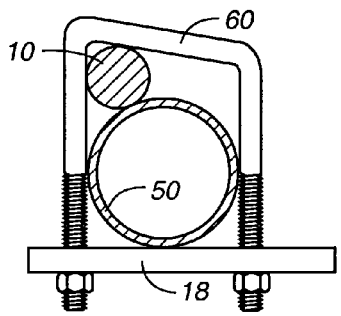
FIG._7B
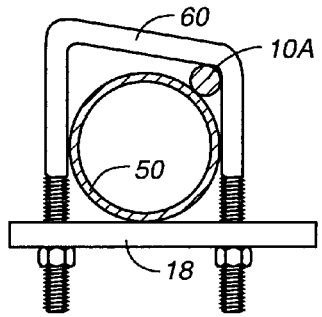
FIG._7C
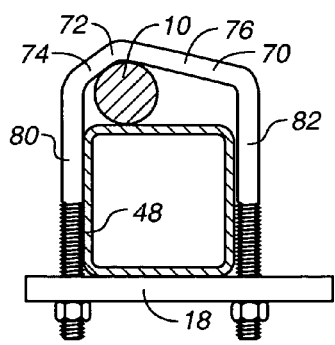
FIG._8A
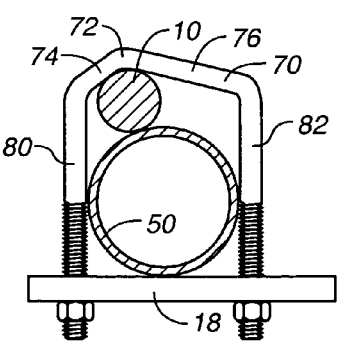
FIG._8B
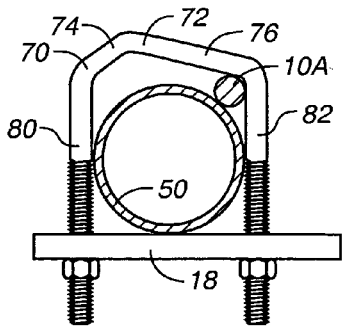
FIG._8C

US 6,991,198 B1

APPARATUS FOR STIFFENING A HANGER ROD

TECHNICAL FIELD

This invention relates to apparatus employed in the building construction industry and more particularly to stiffener apparatus for surrounding and stiffening a hanger rod employed to hold or support pipes, conduits or other components of a building from building structure.

BACKGROUND OF THE INVENTION

Various types of assemblies or devices have been devised for stiffening hanger rods, for example, for seismic bracing purposes. Such devices are often, but not always, associated with multi-directional bracing for electrical conduit, cable trays and mechanical piping systems.

One common type of hanger rod stiffener assembly is that exemplified by the SC228 hanger rod stiffener assembly and the B22 channel combination made available by B-Line Systems, Inc. of Franklin Park, Ill. in which a clamp is disposed inside the channel rod stiffener to capture the threaded hanger rod and stiffen it.

Another well known approach that is that exemplified by the SC-UB hanger rod stiffener assembly utilized with the B22 channel, also made available by B-Line Systems, Inc. wherein a U-bolt is connected to a two-hole plate by hex nuts, the threaded hanger rod being captured between the rounded portion of the U-bolt and the channel.

It is also known to use bolts similar to U-bolts but which are straight, rather than curved, at the closed end thereof, the straight closed end being orthogonal to the threaded legs of the bolt. Hanger rod slippage is a problem with this arrangement.

Prior art hanger rod stiffener assemblies or devices have certain inherent limitations. For example, they are often restricted as to size and the same assembly can not be used for both large and small diameter rods. Virtually all such devices must utilize channel or uni-strut material as the stiffener component per se. Channels can, once they get to be a certain length, also become structurally unstable.

It is also known to weld a hanger rod to a stiffener. This is time consuming and expensive. Furthermore, such a connection is permanent and the stiffener is not removable from the rod once welded into place.

DISCLOSURE OF INVENTION

The present invention relates to rod stiffener apparatus which is characterized by its ease of use, reliability and versatility. The apparatus is readily usable to stiffen both large and small diameter rods; that is, one size of rod stiffener apparatus constructed in accordance with the teachings of the present invention accommodates itself to many different hanger rod sizes. In addition, stiffeners other than open channels may be employed. For example, pipes or square or other rectangular-shaped tubes may be utilized.

The stiffener apparatus of the present invention includes a clamp having two straight, double-ended, spaced, parallel first and second clamp segments threaded over at least portions of the lengths thereof and a third clamp segment integral with and extending between ends of the first and second clamp segments.

The apparatus also includes a plate defining spaced openings. Ends of the first and second clamp segments remote from the third clamp segment project through the spaced openings.

Nuts are threadedly engaged with the ends of the first and second clamp segments projecting through the spaced openings and connect the clamp to the plate.

An elongated stiffener member is disposed between the plate and the third clamp segment for engaging a hanger rod extending parallel to the elongated stiffener member and cooperable with the clamp to maintain the hanger rod in a predetermined position relative to the elongated stiffener and the clamp.

At least a portion of the third clamp segment is straight, non-orthogonally disposed relative to the first and second clamp segments and cooperable with the elongated stiffener member to continuously exert lateral forces on the hanger rod continuously urging the hanger rod to the predetermined position when the hanger rod is clamped between the clamp and the elongated stiffener member.

Other features, advantages, and objects of the present invention will become apparent with reference to the following description and accompanying drawings.

BRIEF DESCRIPTION OF DRAWINGS

FIG. 1 illustrates a threaded hanger rod being stiffened by a prior art rod stiffener assembly and employed to support a pipe holder;

FIG. 2 is an enlarged, cross-sectional view taken along the line 2—2 of FIG. 1;

FIG. 3 is a view similar to FIG. 2 but illustrating another prior art hanger rod stiffener assembly;

FIG. 4 is a view similar to FIGS. 2 and 3 but illustrating an embodiment of apparatus constructed in accordance with the teachings of the present invention being employed to stiffen a hanger rod;

FIG. 5 is a view similar to FIG. 4 but illustrating an alternative embodiment of the present invention;

FIG. 6A shows an arrangement similar to that of FIG. 4 but illustrates use of a tube having a rectangular cross-section as a stiffener member;

FIGS. 6B and 6C show an arrangement similar to FIG. 4 but illustrating a round tubular stiffener member utilized to stiffen hanger rods of large and small diameter, respectively;

FIG. 7A shows an arrangement similar to that of FIG. 5 but illustrating use of a tubular, rectangular-shaped stiffener member;

FIGS. 7B and 7C illustrate an arrangement similar to FIG. 5 but illustrating use of a circular-shaped stiffener member employed, respectively, with large and small diameter hanger rods;

FIG. 8A illustrates yet another alternative embodiment of the invention employing a differently shaped clamp and utilizing a rectangular-shaped tubular member as the stiffener member; and FIGS. 8B and 8C are similar to FIG. 8A but illustrate use of a cylindrically-shaped round tubular stiffener member employed to stiffen hanger rods of large and small diameter, respectively.

MODES FOR CARRYING OUT THE INVENTION

FIGS. 1 and 2 illustrate a typical prior art stiffener assembly utilized to stiffen a threaded hanger rod 10 supporting a pipe holder bracket or yoke 12.

The assembly includes an elongated stiffener member in the form of a channel 14 extending along hanger rod 10.

A plurality of U-bolts 16 have the free, threaded ends thereof passing through holes formed in plates 18 and secured in place relative thereto by nuts 20. When the nuts 20 are tightened, hanger rod 10 has front and rear clamping forces exerted thereon by U-bolts 16 and channel 14.

The prior art approach disclosed in FIGS. 1 and 2 is employed for use with larger diameter hanger rods and cannot be used for smaller diameter rods due to the fact that the curvature of the U-bolt 16 limits the extent to which the channel 14 can approach the outer curved end of the U-bolt.

FIG. 3, on the other hand, illustrates a prior art arrangement typically employed to stiffen hanger rods of smaller diameter. In this arrangement, the hanger rod 10 is disposed within the confines of a channel 14. The hanger rod 10 is captured by a clamp element 22 rotatably connected to a threaded bolt 24 threadedly engaged with a plate 26, the latter also being disposed within channel 14. It will be appreciated that the arrangement of FIG. 3 can be used only with holder rods of smaller diameter, and not with larger diameter rods.

In contrast, and as will be seen below, the apparatus of the present invention may be utilized to stiffen rods of both large and small diameter or cross-section.

FIG. 4 illustrates an embodiment of the present invention wherein a clamp 30 is associated with an elongated stiffener member in the form of channel 14. The clamp has two straight, double-ended, spaced, parallel clamp segments 32, 34 threaded over portions of the lengths thereof. A third clamp segment 36 is integral with and extends between ends of clamp segments 32, 34.

Plate 18 defines spaced openings (not shown) and the threaded free ends of the clamp segments 32, 34 pass therethrough. Nuts 20 are employed to connect the clamp 30 to the plate.

The elongated stiffener member 14 is disposed between the plate and the clamp segment 36 and engages hanger rod 10, the rod of course extending parallel to the elongated stiffener member. The stiffener member and the clamp cooperate to maintain the hanger rod in a predetermined, fixed position relative to the elongated stiffener and the clamp. In FIG. 4, that predetermined position is located mid-way between clamp segments 32, 34.

Clamp segment 36 includes inter-connected straight portions 38, 40. Straight portion 38 extends from and forms an obtuse angle with clamp segment 32. Straight portion 40 extends from and forms an obtuse angle with clamp segment 34. Straight portions 38, 40 define an obtuse angle therebetween and the predetermined position of the hanger rod is at the location the straight portions are inter-connected.

The straight portions 38, 40 exert generally opposed lateral forces on the hanger rod continuously ramping or urging the hanger rod to the predetermined location when the hanger rod is clamped between the clamp and the elongated stiffener member. It will be seen that the arrangement of FIG. 4 allows considerable movement between the elongated stiffener member and the closed end of the clamp so that various sizes of hanger rods can be accommodated and clamped.

FIG. 6A shows the arrangement of FIG. 4, only somewhat larger, and in FIG. 6A the stiffener member is a square tubular member 48 having a rectangular-shaped outer peripheral bearing surface bearing against plate 18 and the hanger rod.

FIG. 6B shows the arrangement of FIG. 4 except that the stiffener member is a cylindrical tube 50 having a round or circular-shaped outer bearing surface. Stiffener member 50 bears against plate 18 and rod 10, lateral forces exerted by straight portions 38, 40 maintaining the rod at their point of intersection.

In FIG. 6C a smaller rod 10A is held by the arrangement shown in FIG. 6B. In this instance, the smaller diameter hanger rod 10A is maintained at the intersection between straight portion 40 of clamp segment 36 and clamp segment 34.

In the FIG. 5 embodiment, the clamp 60 includes two straight, double-ended, spaced, parallel clamp segments 62, 64 and a clamp segment 66 connected thereto and extending therebetween. In this embodiment clamp segment 66 is straight along the entire length thereof and forms an obtuse angle with clamp segment 64 and an acute angle with clamp segment 62. In this instance, the predetermined position occupied by the hanger rod 10 is at the intersection between clamp segment 66 and clamp segment 62, the inclined surface of the clamp segment 66 directing the hanger rod to that position by exerting ramping or caming forces on the hanger rod. Once in the corner defined by clamp segments 62, 66 and channel 14, the rod will stay there due to the continuous forces exerted thereon.

FIG. 7A shows clamp 60 employed in association with a stiffener member 48 having a rectangular (square) shape. In FIG. 7B, the clamp 60 cooperates with plate 18 and round or tubular stiffener member 50 to maintain the hanger rod in position. FIG. 7C illustrates a position assumed by a hanger rod 10A of smaller diameter when clamped into position by this embodiment of the invention.

FIGS. 8A–8C illustrate another approach wherein a clamp 70 has an intermediate clamp segment 72 comprised of two straight portions 74, 76.

Straight portion 76 is longer than straight portion 74; thus, the straight portions connect at a location closer to threaded clamp segment 80 than to threaded clamp segment 82.

In FIG. 8A, the clamp 70 cooperates with rectangular stiffener member 48 to position the hanger rod in a fixed predetermined location corresponding to the point of intersection of straight portions 72, 74.

FIG. 8B is similar to FIG. 8A but illustrates a round tubular stiffener member 50 cooperable with the clamp to position the hanger rod.

FIG. 8C is similar to FIG. 8B. However, in this instance a hanger rod of smaller diameter is positioned at the intersection of straight portion 76 and clamp segment 82.

The invention claimed is:

1. In combination:
    a hanger rod for supporting one or more components of a building from building structure;
    a clamp having a straight first clamp segment and a straight second clamp spaced from said first clamp segment and parallel thereto, each of said first clamp segment and said second clamp segment being double-ended and threaded over at least a portion of the length thereof, said clamp including a third clamp segment integral with and extending between ends of said first clamp segment and said second clamp segment;
    a plate connected to said clamp and defining spaced openings, ends of said first clamp segment and said second clamp segment remote from said third clamp segment projecting through said spaced openings, said first clamp segment and said second clamp segment disposed on opposed sides of said hanger rod and said third clamp segment and said plate disposed on other opposed sides of said hanger rod, said connected plate and clamp surrounding said hanger rod;
    nuts threadedly engaged with the ends of said first clamp segment and said second clamp segment projecting through said spaced openings urging said plate toward said third clamp segment; and an elongated stiffener member surrounded by said connected plate and clamp and disposed between said plate and said third clamp segment, said hanger rod extending parallel to said elongated stiffener member and engaged by said elongated stiffener member, and said elongated stiffener member cooperable with said clamp to maintain the hanger rod in a predetermined position relative to said elongated stiffener member and said clamp wherein said hanger rod is in engagement with said elongated stiffener member and with said clamp, at least a portion of said third clamp segment being straight and non-orthogonally disposed relative to said first clamp segment and said second clamp segment and cooperable with said elongated stiffener member to continuously exert lateral forces on said hanger rod continuously urging said hanger rod to said predetermined position due to clamping engagement of said hanger rod between said elongated stiffener member and the third clamp segment, and said plate being in contact with said elongated stiffener member at a location on said elongated stiffener member spaced from said hanger rod and urging said elongated stiffener member toward said hanger rod and said third clamp segment, said predetermined position located at an intersection between said third clamp segment and said first clamp segment.

* * * * *